W. E. FIELD.
MACHINE FOR TESTING PLASTICS.
APPLICATION FILED MAR. 6, 1916.

1,232,782.

Patented July 10, 1917.
2 SHEETS—SHEET 2.

WITNESS:
S. G. Taylor.

INVENTOR
William E. Field,
BY
Ernest Hopkinson
HIS ATTORNEY

UNITED STATES PATENT OFFICE.

WILLIAM E. FIELD, OF HARTFORD, CONNECTICUT, ASSIGNOR TO THE HARTFORD RUBBER WORKS COMPANY, A CORPORATION OF CONNECTICUT.

MACHINE FOR TESTING PLASTICS.

1,232,782.   Specification of Letters Patent.   Patented July 10, 1917.

Application filed March 6, 1916. Serial No. 82,372.

*To all whom it may concern:*

Be it known that I, WILLIAM E. FIELD, a citizen of the United States, residing at Hartford, county of Hartford, and State of Connecticut, have invented certain new and useful Improvements in Machines for Testing Plastics, of which the following is a full, clear, and exact description.

This invention relates to machines for testing the density, resiliency and permanent set of plastic material, particularly rubber compounds.

An object of the present invention, is to provide a testing device which can be utilized in testing a great variety of rubber products, and which will accurately indicate the results of the tests made.

The usual method of determining various characteristics, such as the density, resiliency and permanent set of vulcanized rubber products, is to force a blunt instrument held in the hand, against the surface of the article, and gage by the physical senses, the depth of penetration, the force used, and the amount which the rubber fails to return to its initial position. Obviously the results obtained by such crude tests are not accurate.

To obviate these disadvantages, the present invention provides mechanical means for moving the testing tool and for positively and accurately indicating the amount of such movements. Briefly, the invention embodies a needle moved in synchronism with an indicator, by means of a known weight. The weight forces the needle against the surface of the article to be tested, and the indicator accurately registers the exact depth of the depression made by the known weight acting through the known period of time, and likewise accurately registers the permanent set of the materials, that is, the amount by which the material fails to return after depression, to its normal condition.

The invention can be readily understood from the following description taken in connection with the accompanying drawing, in which—

Figure 1:
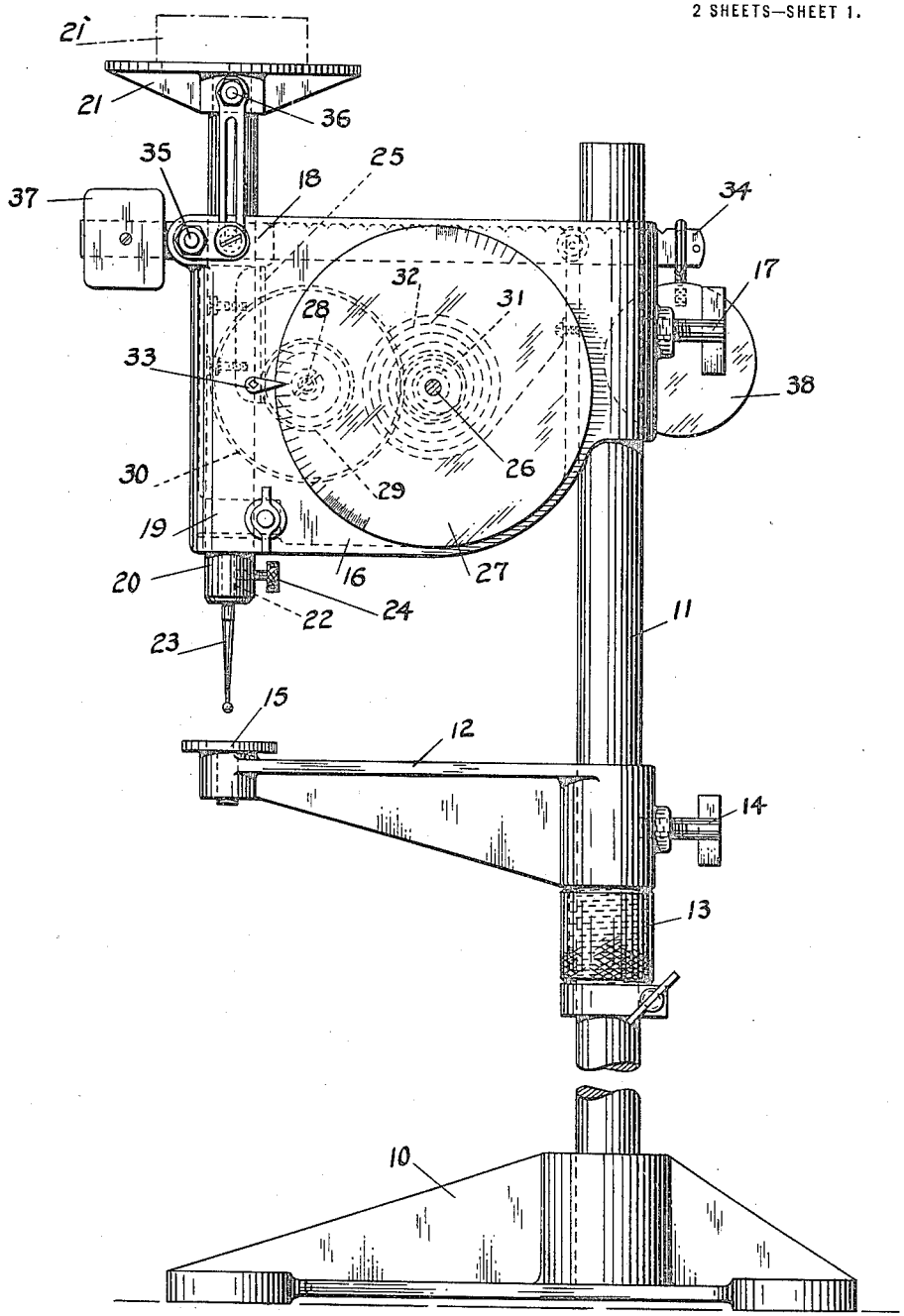
Figure 1 is a side elevation of a machine constructed in accordance with my invention.
Figure 2:
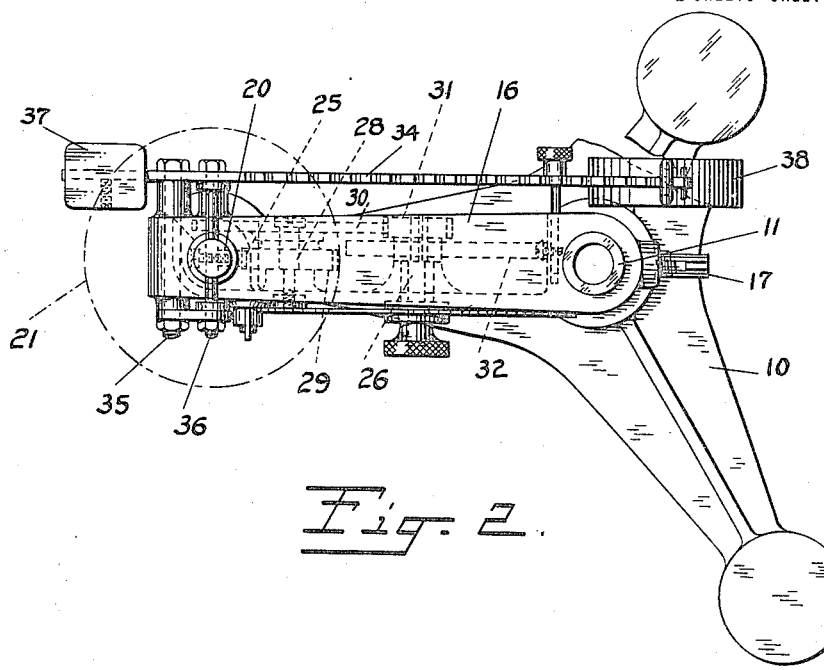
Fig. 2 is a plan view of the parts shown in Fig. 1.
Figure 3:
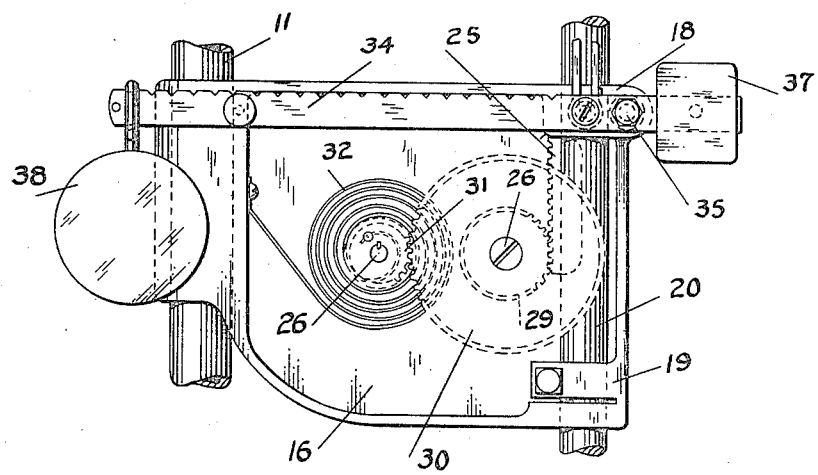
Fig. 3 is a fragmentary rear elevation of the machine.

Referring now to the drawing, in which like characters of reference designate similar parts, 10 designates a base from which rises a standard 11, upon which is slidably mounted a bracket 12. The bracket is adapted to be accurately positioned by a micrometer adjustment 13 and locked in any adjusted position by a set screw 14. The bracket is equipped to removably receive a plurality of tables, one of which is shown at 15, a separate table for each type of article to be tested being preferably used.

Adjustably mounted on the standard above the bracket 12 is a casing 16, which may be locked in any desired position by a set screw 17. The casing carries bearings 18 and 19 in vertical alinement with the table 15 and in which is slidably fitted a shaft 20. The upper end of the shaft, in the present embodiment, is equipped with a platform 21 adapted to support weights of various sizes, one of which is shown dotted at 21' and the shaft is equipped at the lower end with a socket 22 which interchangeably receives various sizes of needles, one of which is shown at 23, there being a set screw 24 in the socket to lock each needle in place.

The shaft 20 is equipped with a rack 25 which is housed within the casing. A shaft 26 is journaled in the sides of the casing and on the exterior of the casing a dial plate 27 is fixed to this shaft. A second shaft 28 is journaled in the sides of the casing and is equipped with two gears 29—30, the gear 29 meshing with the rack 25 and the gear 30 meshing with a gear 31 on the dial shaft 26. A spiral spring 32 is connected at one end to the dial shaft and at the other end to the casing and serves the dual purpose of balancing the weight of the needle shaft 20 and taking up any play in the train of gears described.

The limit of stroke of the needle shaft, in the present embodiment, is about one and one-half inches, the dial being moved by the rack and gear train in unison with the needle shaft and making one complete revolution during stroke of the needle shaft in each direction. The dial carries a scale of 750 major divisions, divided each into five minor divisions each representing two one-thousandths of an inch movement of the needle shaft. A stationary pointer 33 is fixed to the casing and normally registers with the zero end of the scale on the dial, length of movement of the needle shaft being indicated by the division mark on the scale corresponding to such movement coming into register with the needle during turning movement of the dial.

To increase the range of the instrument, a scale beam 34 is fulcrumed on the casing as shown at 35 and is pivotally connected to the needle shaft as shown at 36, the beam carrying a counterbalance weight 37 at one end and being notched along its top edge to receive a known weight 38.

In operation the rubber product to be tested is placed upon the table 15 and the latter is then adjusted by the micrometer device 13 until the needle rests upon the surface of the article. A known weight is then placed upon the flange 21. The weight depresses the needle shaft thereby causing the needle to sink into, without penetrating, the surface of the article. By means of the rack and gear train described, this movement of the needle is transmitted to the dial causing a corresponding rotation thereof. When the dial comes to rest after a desired period of time has elapsed, the amount of movement of the needle will be indicated by the corresponding division mark on the dial plate coming into register with the pointer. The indicator thus registers the exact depression made in the rubber by the needle under the influence of the known weight acting in the known period of time. Subsequently the weight is removed, whereupon the needle is forced back to nearly its original position by the rubber, the amount by which said needle fails to return to its initial position, or permanent set of the rubber, being indicated by the corresponding division mark on the dial coming to rest underneath the pointer.

Although I have described one specific embodiment of the invention, I do not limit myself to the specific apparatus illustrated, since a wide range of modifications may be resorted to within the scope of the appended claims without departing from the spirit or sacrificing any of the advantages of the invention.

Having thus described my invention, what I claim as new and desire to protect by Letters Patent is:

1. Apparatus of the class described, comprising a tool adapted to compress without penetrating the surface of rubber products, a support for the product to be tested, means for adjusting the support with the product thereon so that the tool touches the surface of the product, a lever arm having an adjustable weight thereon connected with the tool, whereby a desired force may be imparted to said tool to depress said surface, a registering device, and means positively actuating the registering device in synchonism with the tool.

2. Apparatus of the class described, comprising a tool adapted to compress without penetrating the surface of rubber products, a support for the product to be tested, means for moving the support and tool relatively to initially dispose the tool in contact with the surface of the article to be tested, a rotary dial, a gear train connecting the tool and dial for movement in unison, a spring balancing the moving parts and taking up play in said gear train, and means for moving said tool.

3. Apparatus of the class described, comprising a tool adapted to compress without penetrating the surface of rubber products, a support for the article to be tested, means for adjusting the tool and support relatively, a stationary pointer, a revoluble dial having division marks adapted to register with said pointer, gearing positively connecting the tool and the dial for movement in unison, a balance spring normally holding said dial to dispose the initial division mark thereon in register with said pointer, and a weight supporting device connected with the tool and adapted to receive a weight for depressing the tool into the surface of the article to be tested.

Signed at Hartford, county of Hartford, State of Connecticut, this 2nd day of March, 1916.

WILLIAM E. FIELD.